C. BARRETT.
RECOVERING NOXIOUS AND OTHER MATERIALS FROM SMELTER FUMES.
APPLICATION FILED JAN. 15, 1915.

1,188,237. Patented June 20, 1916.

WITNESSES:
Nettie H. Barrett
Geo Monow

INVENTOR
Clarence Barrett

UNITED STATES PATENT OFFICE.

CLARENCE BARRETT, OF SALT LAKE CITY, UTAH, ASSIGNOR OF ONE-HALF TO GEORGE MORROW, OF SALT LAKE CITY, UTAH.

RECOVERING NOXIOUS AND OTHER MATERIALS FROM SMELTER-FUMES.

1,188,237. Specification of Letters Patent. Patented June 20, 1916.

Application filed January 15, 1915. Serial No. 2,407.

*To all whom it may concern:*

Be it known that I, CLARENCE BARRETT, a citizen of the United States, residing at 417 East Second South street, Salt Lake City, in the county of Salt Lake and State of Utah, have invented new and useful Improvements in Recovering Noxious and other Materials from Smelter-Fumes, of which the following is a specification.

This invention relates to the recovery of noxious and other materials from smelter fumes and its object is to prevent the dissemination of such fumes into the atmosphere and the harm to vegetable and animal life occasioned thereby.

Smelter fumes are harmful because of the quantity of sulfur dioxid contained in them and there are also losses due to the escape of both metallic and non-metallic values.

In accordance with the present invention the smelter fumes are caused to traverse a chamber interposed in the escape flue through which chamber a solution of the bisulfid of an alkali or alkaline earth metal is flowing in thin films. By this means the sulfur dioxid is absorbed by the alkaline solution with the production of thiosulfates of calcium, sodium, or potassium, as the case may be, and simultaneously therewith the soluble metal combinations in the smelter fumes are deposited as the sulfids of the metal by the action of the bisulfid of the alkaline earth metal.

The invention contemplates an arrangement whereby the alkaline solution is used over and over again until it becomes quite saturated, and provision is made for arresting particles of metallic substances precipitated by the bisulfid to prevent such precipitates from mingling with the thiosulfate solution.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications come within the scope of the appended claims.

Figure 1:
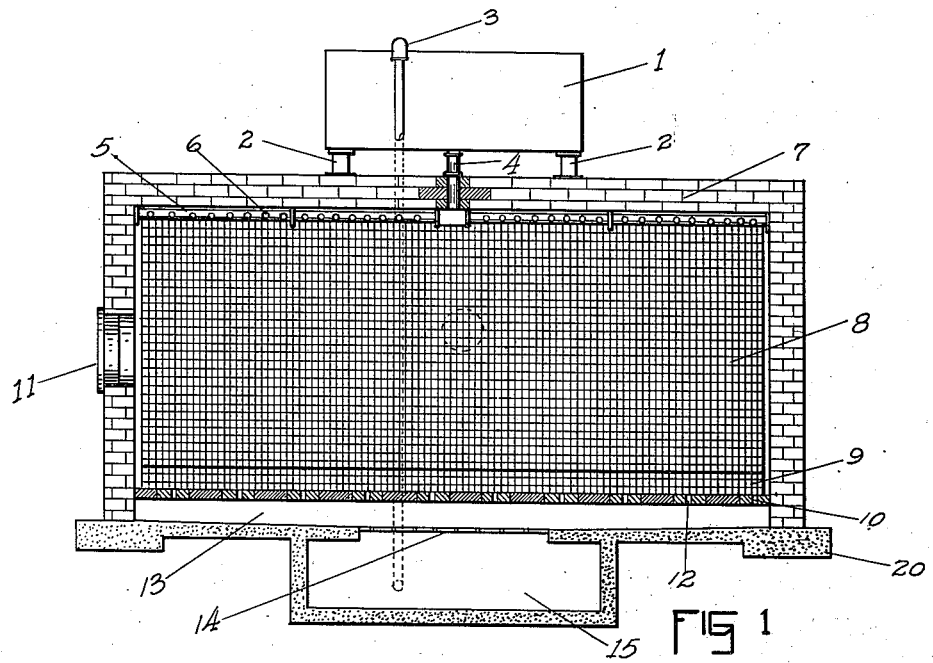
Figure 2:
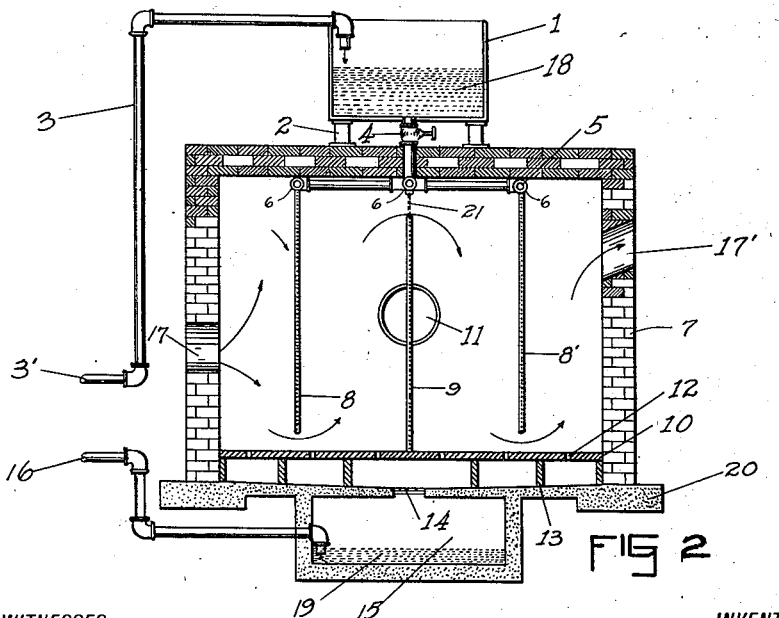

In the drawings: Figure 1 is a vertical cross-section of an apparatus constructed in accordance with the present invention. Fig. 2 is a vertical longitudinal section thereof.

Referring to the drawings, there is shown a tank 1 designed to contain a bisulfid solution, the liquid being indicated at 18. This tank is supported upon a chamber inclosed by walls 7 and provided with an inlet opening 17 and an outlet opening 17' for the interposition of the chamber in the outlet flue of the smelter, whereby the smelter fumes in passing from the furnace toward the atmosphere must traverse the chamber inclosed by the walls 7. Within the chamber so formed are hung curtains 8 and 8' on opposite sides of an upright baffle 9, all being constructed of a material capable of being wet and kept wet by the alkaline solution. The bottom of the chamber inclosed by the walls 7 is formed by a flooring 20 usually of cement with its upper surface slanting toward a central opening 14 communicating with a compartment 15 designed to receive alkaline solution which has traversed the chamber inclosed by the walls 7, and which because of the smelter fumes may be termed a gas chamber. Since the alkaline solution after traversing the gas chamber has been enriched by absorption and conversion of sulfur dioxid into thiosulfates of certain metals, the enriched solution within the compartment 15 is indicated at 19. Such solution is withdrawn from the compartment 15 through a pipe 16 which may be considered as communicating with a suitable pump, while the discharge pipe of the pump is indicated at 3 and 3' and ultimately discharged into the tank 1. The solution flows from the tank 1 through a controlling valve 4 into distributing pipes 5 having perforations 6 by means of which the solution is distributed upon the curtains 8 and upon the baffle 9, the stream of solution reaching the baffle 9 being indicated at 21.

Above the flooring 20 is a false flooring 10 preferably of wood spaced from the flooring 20 by joists 13 or otherwise. The flooring 10 has passages 12 therethrough which are covered by sacking or other suitable filtering material to arrest particles of metallic substances precipitated by the bisulfid solution, so that such particles cannot mingle with the thiosulfate solution 19.

The smelter fumes enter the gas chamber by way of the opening 17 and after traversing this chamber, as indicated by the arrows in Fig. 2, the fumes escape by way of the opening 17' either directly to the atmosphere or through an extension of the usual flues. In passing through the gas chamber the fumes come in contact with thin sheets of bisulfid solution, whereby the gases, and especially the sulfur dioxid is absorbed, being converted by the bisulfid into a thiosulfate of calcium, or sodium, or potassium, in accordance with the particular bisulfid employed.

The gaseous metallic contents of the fumes are precipitated in the form of sulfites by the action of the bisulfid and are ultimately arrested by the filtering material preventing the escape of such particles to the compartment 15. From time to time the accumulation of the precipitates is removed through a doorway 11 provided for the purpose. The bisulfid solution when sufficiently saturated with thiosulfates may be evaporated to dryness for the recovery of the materials in solution, or may be employed as a solution for leaching purposes.

By subjecting the smelter fumes on their way to the atmosphere to the action of a bisulfid solution whereby such noxious substances as sulfur dioxid are rendered innoxious, and whereby certain values otherwise lost by dissemination in the atmosphere are recovered, the fumes on escape from the outlet flue to the smelter are harmless to either vegetable or animal life and the previously noxious substances heretofore allowed to escape into the atmosphere and thereby become harmful to the neighborhood of the smelter are rendered both innoxious and valuable. Moreover, certain metallic values heretofore lost in the smelter fumes are recovered in a manner to be available separately from the ordinarily noxious contents of the fumes.

What is claimed is:—

1. The process of treating smelter fumes for the elimination of sulfur dioxid therefrom and the recovery of volatile metallic values, consisting in subjecting the smelter fumes on their passage from the furnace to the atmosphere to the action of a solution of bisulfid of an alkali or alkaline earth metal, thereby converting sulfur dioxid contained in the fumes into a soluble salt by the alkali contained in the solution, and also precipitating the soluble metal combinations in the fumes in the form of insoluble salts of the metals and collecting such insoluble metallic salt separately from the solution.

2. The process of rendering smelter fumes innoxious and recovering values therefrom, which consists in passing the fumes on their way from the furnace to the atmosphere through a solution of bisulfid of an alkali or alkaline earth metal and thereby causing the absorption of the sulfur dioxid contained in the fumes by the bisulfid solution and the conversion of volatile metallic values contained in the fumes into insoluble salts and screening the precipitates containing the metals from the solution containing the absorbed sulfur dioxid.

3. The process of treating smelter fumes to render them innoxious and to recover metallic values therefrom, consisting in treating the fumes on their way from the furnace to the atmosphere with a solution of a bisulfid of an alkali or alkaline earth metal and thereby causing the absorption of sulfur dioxid contained in the fumes and the conversion in the solution of the bisulfid into thiosulfate, and also causing the conversion of volatile metallic combinations in the fumes by the bisulfid solution into sulfids of the metals and at the same time separating the precipitates so produced from the thiosulfate solution.

4. The process of rendering smelter fumes innoxious and at the same time recovering values therefrom, which consists in producing a flow of a solution of a bisulfid of an alkali or alkaline earth metal in closed circuit through the path of the fumes on their way from the smelter to the atmosphere, and thereby continuously absorbing the sulfur dioxid contained in the fumes by the circulating bisulfid solution and simultaneously therewith causing the conversion of the metallic combinations in the fumes into sulfids of the metals and separating the precipitates so produced from the solution during the progress of the treatment of the fumes.

CLARENCE BARRETT.

Witnesses:
JOHN M. BUTLER,
J. W. HUTCHINSON.